E. T. SILVIUS.
COMPUTING CHEESE CUTTER.
APPLICATION FILED OCT. 17, 1914.

1,210,552.

Patented Jan. 2, 1917.
4 SHEETS—SHEET 1.

WITNESSES:

J. H. Gardner
M. E. Sparrow

INVENTOR:

Ellis T. Silvius

E. T. SILVIUS.
COMPUTING CHEESE CUTTER.
APPLICATION FILED OCT. 17, 1914.

1,210,552.

Patented Jan. 2, 1917.
4 SHEETS—SHEET 4.

WITNESSES:
J. H. Gardner
M. E. Sparrow

INVENTOR:
Ellis T. Silvius

UNITED STATES PATENT OFFICE.

ELLIS T. SILVIUS, OF INDIANAPOLIS, INDIANA, ASSIGNOR TO THOMAS S. GETTLE, OF GREENFIELD, INDIANA.

COMPUTING CHEESE-CUTTER.

1,210,552.

Specification of Letters Patent.

Patented Jan. 2, 1917.

Application filed October 17, 1914. Serial No. 867,061.

*To all whom it may concern:*

Be it known that I, ELLIS T. SILVIUS, a citizen of the United States, residing at Indianapolis, in the county of Marion and State of Indiana, have invented a new and useful Computing Cheese-Cutter, of which the following is a specification, reference being had to the accompanying drawings and to the letters and figures of reference marked thereon.

This invention relates to the type of cheese cutter that is designed for dividing a cylindrically shaped cheese into segments or slices of such thickness as may be desired, more especially for selling the cheese at retail, the invention having reference more particularly to mechanism or apparatus mounted on a frame for supporting and controlling the cheese so that it may be accurately divided by a cutting knife mounted on the frame.

An object of the invention is to provide compactly constructed and reliable means for controlling and rotating the turn-table that is designed to support the cheese, an aim being to eliminate working joints and toggle devices that might develop lost motion in operation and affect the accuracy of the operation of the machine.

Another object is to provide an improved actuating appliance and means for fixedly locking the appliance to the turn-table of the machine, so that when the actuator is stopped after having advanced the turn-table the latter shall be accurately stopped and not require the use of a momentum arrester.

A further object is to provide an improved computing scale and so arranged that it shall be reliable in indicating the proper position of the controlling apparatus of the turn-table for determining the number, and consequently the thickness of the slices, that may be intended or desired to be produced from a cheese of known weight and cost.

A still further object is to provide computing and turn-table operating and controlling appliances that shall be so constructed as to be adapted to be readily adjusted for changing the extent of rotary movement of the turn-table, and which shall be of simple and inexpensive construction and yet be reliable, durable and economical in use.

With the above-mentioned and other objects in view the invention consists in an improved computing cheese cutter including a turn-table and novel operating and controlling appliances for the turn-table provided with novel indicating means for the operating and controlling appliance, and improved locking means whereby to lock the actuating devices to the turn-table for periodically moving the turn-table as required. The invention consists also further in the novel parts, and in the combinations and arrangements of parts, as hereinafter particularly described and further defined in the accompanying claims.

Referring to the drawings, Fig. 21 is a fragmentary plan slightly modified; Fig. 22 is a fragmentary plan of the form shown in Fig. 14 slightly modified; and, Fig. 23 is a fragmentary plan showing still another modification.

Throughout the drawings, similar reference characters indicate corresponding elements or features of construction.

A practical embodiment of the invention preferably comprises a circular portion 1 having arms 2, 2', and a central hub 3, constituting the main portion of a main frame, the portion 1 having an arm 4 thereon provided with a pivot pin 5. A turn-table comprises a circular rim portion 6, arms 7, 7', and a central hub 8, the latter being supported upon the hub 3 and having a shaft 9 that is rotatably mounted in the hub 3 and preferably retained therein by a pin 10 and a washer 11 placed between the pin and the under side of the hub 3. The turn-table is provided with a top or cheese board 12, as is customary. A knife frame 13 is mounted on the pivot pin 5 and has a handle portion 14, a suitable knife 15 being secured to the frame so as to coöperate with the turn-table top or cheese board 12. Preferably the circular portion 6 of the turn-table has a guideway 16 in its inner side and a similar guideway 17 in its outer side or peripheral portion. A carrier plate 18 is provided which is suitably guided under the rim portion 6 of the turn-table so as to move either therewith or backward thereunder, and preferably is provided with guide projections 19 and 19' extending upward adjacent to the periphery of the portion 6 and having lugs 20 and 20' thereon respectively that extend into the guideway 17. The carrier plate has also projections 21 and 21' that extend upward adjacent to the inner side of the portion 6 and are provided with securing screws or devices 22 and 22' and also securing screws 23 whereby they are fixedly secured to the plate, the projections having lugs 24 and 24' thereon respectively that extend into the guideway 16. The carrier plate is thus supported and guided by the rim portion of the turn-table. Preferably the circular portion 1 of the main frame has a guide or face 25 thereon arranged under the plate 18 and below the rim portion of the turn-table to afford support therefor if desired, and the main frame preferably has also a guide face 26 thereon to afford support for the forwardly projecting portion of the operating and controlling mechanism of the turn-table. The carrier plate 18 is provided with a pivot 27 that is arranged under the rim portion 6 of the turn-table, the plate having also a projecting stop pin 28 thereon spaced apart from the pivot. An actuator member 29 is connected with the carrier plate 18, being preferably arranged upon the plate and provided with a pivot hole 30 receiving the pivot 27 whereby the member is pivotally connected to the plate so as to move on a horizontal plane, the member projecting forwardly and having a handle portion 31 projecting forward so as to constitute an operating lever. The member 29 has a stop shoulder 32 that is brought into contact with the projection 28 when the member is swung in one direction, for invariably limiting the movement of the actuator member in one direction, being toward the left hand as illustrated. The member 29 has a stop shoulder or face 33 that is eccentric to the axis of rotation of the member for variably stopping the rotary advance movement of the turn-table at the required position. The member 29 is provided with graduated markings 34 arranged radially with respect to the axis of rotation of the member, and suitable numerals 35 are placed on the markings to indicate the number of slices that may be cut from the cheese, other suitable numerals 36 being placed also on the markings and designed to indicate the total weights of various cheeses, in order that the merchant may determine the retail price of a slice of cheese of certain thickness required in order to make a profit on his business, such markings and numerals constituting a computing scale, which for convenience is preferably formed on a scale plate 37 which is secured to the top of the member 29.

For the purpose of setting the operating mechanism so that the turn-table shall be rotated the required extent for dividing the cheese into the required number of segments, a setting and controlling appliance is provided which preferably comprises a plate 38 having a slot 39 therein which receives a screw-threaded stud or binding screw 40 connected to the member 29 and provided with a thumb nut 41 whereby the plate 38 is adjustably secured to the member 29, the plate 38 having a pointer or indicating mark 42 thereon that is brought to one or another of the markings 34 of the computing scale. Preferably the plate 38 has a pivot hole 43 therein that receives the pivot 27 whereby the plate is steadied and also guided while being adjusted to the computing scale. When the member 29 is swung on its pivot it carries the plate 38 which is practically an adjustable part of the member 29 and has a stop stud or projection 44 adapted to limit the movement of the member 29 toward the right hand, the stud 44 preferably having an eccentric 45 thereon which may be adjusted at the factory, if required, when testing the machine in order to secure accuracy of movement of the operating parts, the eccentric being brought into contact with the periphery of the turn-table. The pivotal movement of the operating lever, as will be seen, is limited in one direction by the stop pin 28, and in the opposite direction by the stud 44, the extent of movement of the lever, however, being varied by readjusting the plate 38 on the member 29.

In order that the operating lever shall be positively locked to the turn-table and the locking automatically controlled through the ordinary operating movement of the lever, a lock is provided which preferably comprises a locking arm 46 that is pivotally mounted on the pivot 27 and between the plate 38 and the rim portion 6 of the turn-table, the arm having a pivot hole 47, preferably oblong, receiving the pivot and having also two projections 48 and 49 thereon arranged on opposite sides of the pivot and extending upward on opposite sides respectively of the rim portion 6, the projections being suitably spaced apart to permit the projections to clear the rim portion when the arm is retracted and to grip the rim portion when the arm is swung forward on its pivot, the latter movement being accomplished by means of a projection 50 that is fixed on the plate 38 and preferably provided with an adjusting screw 51 adapted for engagement with the arm, the adjusting screw being designed for taking up lost motion, if required, and insure positive gripping action of the lock at the moment the stud or projection 44 is stopped by the periphery of the turn-table after swinging the operating lever on its pivot. The member 29 is provided with a lug 52 that extends upward at a suitable distance from the projection 50, being on the opposite side of the arm 46 from the projection and permitting some movement of the operating lever without moving the arm 46.

Figure 1:
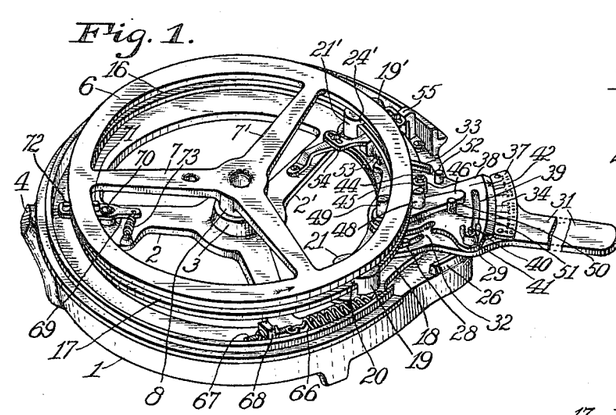
—Figure 1 is a perspective view of a cheese cutter constructed substantially in accordance with the invention, the cutting knife and the turn-table top being omitted as unnecessary to an understanding of the structure more particularly involved in the invention.
Figure 2:
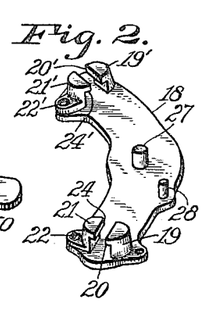
Fig. 2 is a perspective view of a novel appliance comprising a part of the operating and controlling mechanism of the turn-table.
Figures 3, 4, 5:
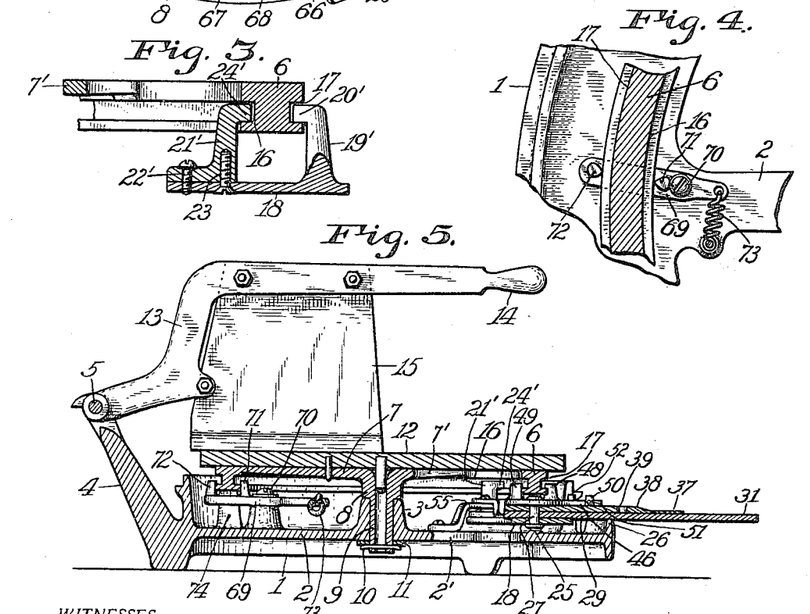
Fig. 3 is a fragmentary sectional elevation of the turn-table and the appliance shown in the preceding figure.
Fig. 4 is a fragmentary sectional plan view illustrating a device for preventing backward movement of the turn-table.
Fig. 5 is a vertical sectional elevation of the complete cheese cutter taken on a longitudinal central plane.
Figures 6, 7, 8, 9, 10, 11, 12, 13:
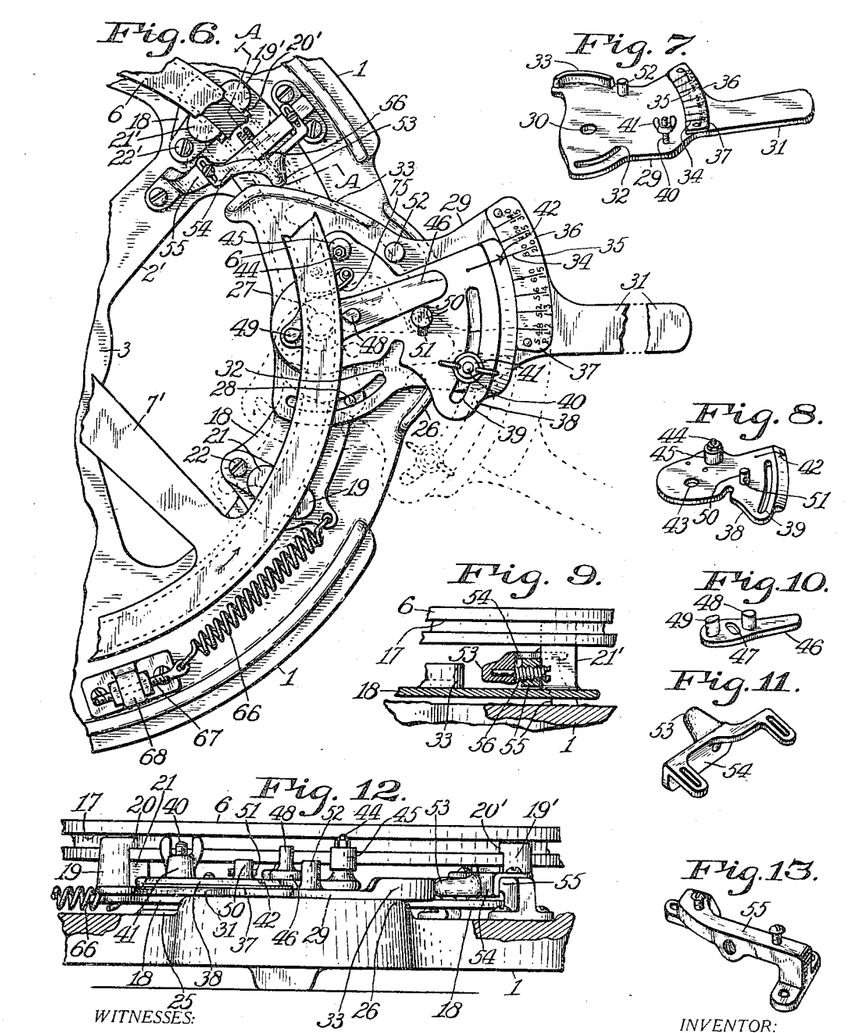
Fig. 6 is a fragmentary plan, partially broken away, of the improved cheese cutter.
Fig. 7 is a perspective view of a novel actuating and controlling appliance provided with a computing scale.
Fig. 8 is a perspective view of a controlling element of the actuating appliance.
Fig. 9 is a fragmentary sectional elevation approximately on the line A A on Fig. 6.
Fig. 10 is a perspective view of the improved locking device whereby the actuator is positively locked to the turn-table.
Fig. 11 is a perspective view of an improved stop for the actuator.
Fig. 12 is a fragmentary front elevation of the cheese cutter.
Fig. 13 is a perspective view of a support preferably provided for the stop.
Figures 14, 15, 16, 17, 18, 19, 20:
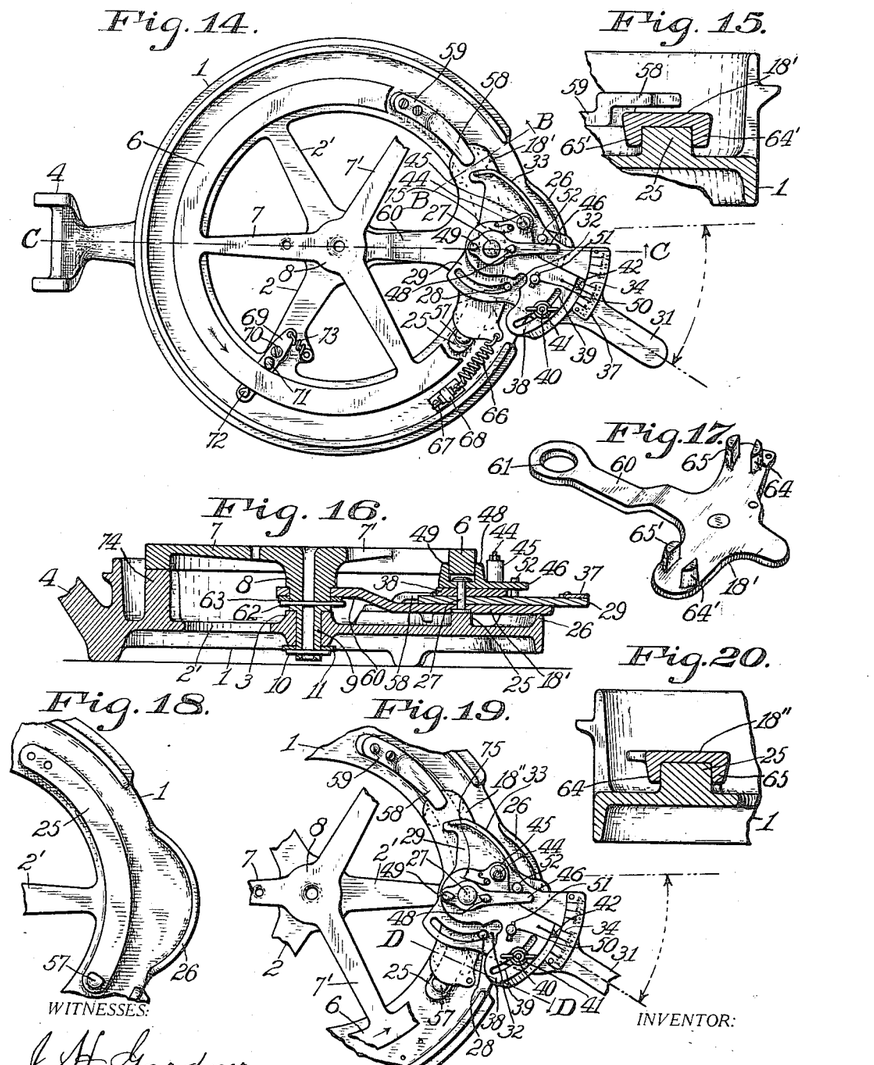
Fig. 14 is a top plan of the novel cheese cutter slightly modified, omitting the turn-table top and the cutting knife.
Fig. 15 is a fragmentary section approximately on the line B B on Fig. 14.
Fig. 16 is a section on the line C C on Fig. 14.
Fig. 17 is a perspective view of an appliance, inverted, comprising a part of the operating and controlling mechanism shown in Figs. 14 to 16, inclusive.
Fig. 18 is a fragmentary plan of the main frame of the cheese cutter.
Fig. 19 is a fragmentary top plan of the novel cheese cutter slightly modified.
Fig. 20 is a fragmentary section approximately on the line D D on Fig. 19.

For the purpose of limiting the advance rotary movement of the turn-table a suitable stop member 53 is fixedly mounted on the main frame of the machine so as to be engaged by the eccentrically arranged stop face or shoulder 33, the stop member preferably being formed on a supporting bar 54 adjustably mounted on a bridge 55 which is fixedly secured upon the main frame, permitting slight adjustment of the stop member 53 at the factory if necessary when trying out the accuracy of the operation of the machine, the bridge preferably being provided with an adjusting screw 56 that engages the member 53 so as to facilitate the making of the adjustment, which may be found necessary owing to faulty workmanship or inaccuracy in fitting various parts together. The bridge 55 in the present case conveniently serves as a stop device against which the projections 19' and 21' are carried by the plate 18 when moved toward the left hand without moving the turn-table, the plate 18, as will be seen, being stopped when moved toward the right hand by the stop member 53 engaged by the eccentric shoulder 33. It will be understood, however, that the operating and controlling mechanism when moved toward the left hand may be stopped by means of a projection 57 fixed upon the main frame opposite the left hand end of the plate 18, as shown in Figs. 14 and 19, and that the mechanism may be stopped after movement toward the right hand by means of a stop member 58 having a foot 59 which is secured to the main frame beyond the opposite end of the plate 18, so that the member 58 shall be engaged by the eccentric face or shoulder 33.

In some cases, as shown in Figs. 14, 15, 16 and 17, the carrier plate 18' may be provided with a guide arm 60 having a pivot hole 61 therein to receive the hub 8 of the turn-table for guidance of the arm, the latter being supported by a pin 62 inserted transversely in the hub and a collar 63 between the pin and the arm. The plate 18' may be supported upon the guide faces 25 and 26 or on either one of the faces, in which case the projections, as 19, may be omitted from the plate 18'. It will be seen that the operating and controlling mechanism of the turn-table constructed as hereinbefore described is directly connected with the turn-table and may be carried therewith from the main frame of the machine, so that all the working parts are compactly arranged.

In some cases, as shown in Figs. 14 to 17 19, 20, the under side of the plate 18', 18'', is provided with guides 64 and 64' extending down on the outer side of the guide 25 which projects upward a suitable distance from the main frame, and oppositely arranged projections 65 and 65' extending downward on the inner side of the guide 25, the latter supporting the plate. In this case the arm 60 may be dispensed with if desired.

In some cases a coil spring 66 is connected to the carrier plate 18, 18'' and suitably connected to the main frame of the machine, the spring preferably being provided with an adjusting screw 67 that is adjustably connected to a post 68 fixed on the rim portion 1 of the frame, for adjusting the tension of the spring which is adapted to retract or draw the carrier toward the left hand side until arrested by its stop, when the carrier is released from the turn-table. This prevents the operating and controlling mechanism from being idly or accidentally moved between its stops when not locked to the turn-table.

For the purpose of preventing the turn-table from being accidentally turned backward, as by the cutting knife when dividing the cheese, it is preferable to provide an automatic lock which comprises an arm 69 suitably connected to a pivotal post 70 fixed on one of the arms of the main frame, the arm 69 having two projections 71 and 72 thereon that extend upward in contact with opposite sides respectively of the rim portion 6 of the turn-table, a spring 73 being connected to the arm and also to the main frame and constantly holding the projections in normal position to prevent backward movement of the turn-table, the spring permitting the arm 69 to swing slightly to release and permit the turn-table to turn forward.

The main frame of the cheese cutter is provided as usual with a bearing 74 for the rim of the turn-table in proximity to the arm 4 to resist the thrust of the cutting knife when in operation. The bearing and also the center bearing of the turn-table serve to slightly retard the operation of the turn-table, so that the carrier plate 18 when hung on the turn-table may be moved without causing the turn-table to move.

Figures 21, 22, 23:
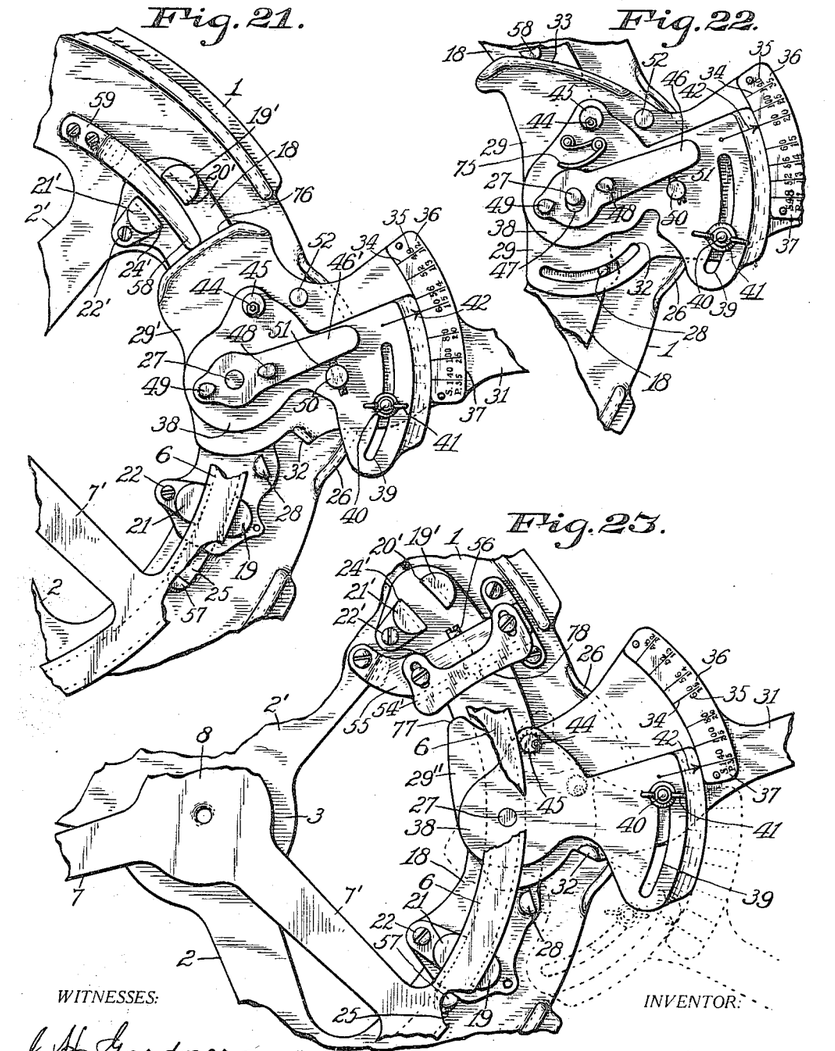

In case the pivot hole in the arm 46 is oblong or slot-like, a spring 75 preferably is provided and mounted on the adjustable member 38 of the operating mechanism and yieldingly presses the arm against the pivot 27 so as to normally maintain the locking devices in contact with the turn-table and insure immediate locking action when it is required to actuate the turn-table, the relative arrangement being more clearly illustrated in Fig. 22. This arrangement permits the carrier plate to be immediately retracted on slight movement of the operating lever toward the left hand without tending to move the turn-table backward.

A slight modification having reference to the adjustable means for varying the extent of rotary movement of the turn-table is illustrated in Fig. 21, showing an eccentric shoulder or contact portion 76 formed on the member 29' so as to be inclined in reverse direction to the equivalent device 33, this requiring that the computing scale be arranged in reverse order to that illustrated in the preceding figures of the drawings. In this case the pivot hole in the locking arm 46' is circular and snugly receives the pivot 27.

In Fig. 23 still other modifications of structure are illustrated, the adjusting devices for varying the travel of the turn-table being reversed, the member 29" having a contact finger 77 thereon that is moved into contact with an elongated stop surface 78 upon a bar 54' suitably mounted fixedly on the main frame of the machine, the stop surface being eccentric to the pivot 27, so that the result of operation is not different with this modification. Also, as illustrated in Fig. 23, the locking arm 46 having the devices thereon for engagement with the turn-table is omitted, the operating lever being enabled to actuate the turn-table when the projection 44 or the eccentric thereon is forced by the lever into contact with the periphery of the turn-table which draws the guide projections 21 and 21' against the opposite or inner side of the rim portion 6 of the turn-table, so that the operating lever is practically clamped to the turn-table, and is released immediately on reverse movement of the lever, as will be apparent.

It should be understood that besides the modifications disclosed, other variations in the details of construction are contemplated and may fairly be made within the scope of the accompanying claims.

In practical use, a cheese having been placed centrally upon the cheese-supporting table or turn-table top, the plate 38 is set to the proper marking on the scale plate, if not already in proper position, to bring about the desired result, the cutting knife being tilted back out of the way, the operating lever handle 31 is moved toward the left hand until stopped. On movement of the lever the arm 46 is automatically released from engagement with the turn-table, the arm being slightly dragged back relatively to its pivot if its pivot hole is oblong; or, if the hole snugly receives the pivot 27, during movement of the lever the projection 52 is brought into contact with the arm 46 and moves it on its pivot so as to release the carrier plate from the turn-table, after which the carrier plate is moved on further movement of the handle until arrested by the device designed for stopping the backward movement of the carrier. The operating mechanism being now in proper position for further action, the handle is moved toward the right hand about the pivot 27 and engages the arm 46 which is carried around and causes the projections 48 and 49 to grip the turn-table tightly when the projection 44 is stopped so as to arrest the movement of the operating lever on its pivot, the lever being pushed farther toward the right hand and thereby turning the turn-table until the eccentric portion 33 comes into contact with the stop member provided for limiting the forward movement of the controlling mechanism and the turn-table. The turn-table and the cheese being now in proper position, the cutting knife is operated to sever the desired portion from the cheese. In case a double portion of cheese is desired it is obvious that the operating lever is operated twice in succession before cutting the cheese, and thus by repeated movement of the turn-table thicker slices may be obtained. In case a thinner slice is desired the plate 38 is readjusted so that the eccentric portion 33 is moved about the pivot 27 to bring the fuller portion of the eccentric opposite to the stop member 53 or 58, therefore lessening the travel of the operating and controlling mechanism and the advance movement of the turn-table. When the operating and controlling mechanism is suddenly stopped in its advance movement it is still fixedly locked to the turn-table and therefore positively stops the advance movement of the turn-table, so that the division of the cheese into the desired number of segments is accurately accomplished.

It will be understood that in operation when the machine is constructed as illustrated in Fig. 21 the eccentric 76, having been adjusted as herein-before described, is moved into contact with the stop member fixed on the main frame. It will also be understood that when the machine is constructed as illustrated in Fig. 23 the contact finger or device 77 is carried into contact with the stop surface 78 at such point on the bar 54' as is required, to be effected by adjustment of the plate or member 38 on the member 29 so as to bring the contact finger to the required position.

Having thus described the invention, what is claimed as new is—

1. A cheese cutter including a frame and a table rotatably mounted on the frame and provided with means for rotating and varying the extent of rotation of the table carried by the table.

2. A cheese cutter including a frame and a table rotatably mounted on the frame and provided with means for variably rotating the table and means for indicating the variability of rotation carried by the table.

3. A cheese cutter including a frame, a table rotatably mounted on the frame and provided with means for variably rotating the table, and means for controlling the variability of rotation carried by the table.

4. A cheese cutter including a frame and a table rotatably mounted on the frame and provided with movable actuating means carried by the table, and means carried by the actuating means for locking the actuating means to the table.

5. A cheese cutter including a frame and a table rotatably mounted on the frame and provided with actuating means carried by the table, the actuating means being provided with means for enabling the actuating means to clutch and rotate the table.

6. A cheese cutter including a frame, a table rotatably mounted on the frame, a carrier movably guided by the table, and an operating lever pivoted to the carrier and provided with a motion-limiting device for engagement with the table to coöperate with the carrier for clamping the lever to the table.

7. A computing cheese cutter including a frame, a table rotatably mounted on the frame, actuating means for the table guided to move with the table and including a device having pivotal movement and adapted for engagement with the table to limit the pivotal movement, and means for locking the actuating means to the table.

8. A cheese cutter including a frame, a table rotatably mounted on the frame, and actuating means guided to move with the table and including a device having pivotal movement and adapted for engagement with the table to stop the pivotal movement of the device and enabling the actuating means to start and rotate the table.

9. A cheese cutter including a frame, a table rotatably mounted on the frame, and operating and controlling means movably guided by the table and comprising a pivoted lever and constructed for clutching and moving the table, and a locking device movably mounted on and controlled by the lever for fixedly locking the lever to the table.

10. A cheese cutter including a frame, a table rotatably mounted on the frame, and actuating means including a carrier having sliding guiding support, and a lever having pivotal connection with the carrier and provided with a device to be moved by the lever into engagement with the table for rotating the table.

11. A cheese cutter including a frame, a table rotatably mounted on the frame, and actuating means including a carrier having sliding frictional support on the table, and a lever having pivotal connection with the carrier and provided with a device to be moved by the lever into engagement with the table for rotating the table.

12. A cheese cutter including a rotatable table, a movable actuating appliance having a pivot and also a lug device, the appliance being carried by the table, and a locking element rotatably mounted on the pivot and having a device for engagement with the table for rotating the table, the locking element having an arm to be engaged by the lug device on movement of the actuating appliance.

13. A cheese cutter including a frame, a table rotatably mounted on the frame, and actuating means including a carrier movably guided to move with the table, and a lever having pivotal connection with the carrier and provided with an adjustable member having a device thereon to be carried on movement of the lever into engagement with the table for rotating the table.

14. A cheese cutter including a rotatable table having a continuous engagement portion, a carrier guided by the engagement portion and having a pivot, a lever connected to the pivot and having a projection thereon to be carried, on movement of the lever in one direction, into engagement with the table, and means for limiting the movement of the lever in the opposite direction relatively to the carrier.

15. A cheese cutter including a frame, a table rotatably mounted on the frame, and actuating means including a carrier movably guided to move with the table, and a lever having pivotal connection with the carrier and provided with an adjustable member having a device adjustably mounted thereon to be carried on movement of the lever into engagement with the table for rotating the table.

16. A cheese cutter including a rotatable table, two fixed stops, and operating and controlling mechanism for rotating the table variable distances guided adjacent to the table and provided with means movably connected together for varying the extent of movement of the mechanism together with the table, the mechanism having means for rotating the table and being movable to or from each one of the two fixed stops.

17. A computing cheese cutter including a frame, a table rotatably mounted on the frame, a carrier guided to move adjacent to the table, an operating lever pivoted to the carrier and having a computing scale thereon, the lever having also a controlling member thereon adjustable to the computing scale and provided with a device for engagement with the table to rotate the table, and a stop device supported on the frame to be engaged by the controlling member for stopping the table.

18. A computing cheese cutter including a frame, a table rotatably mounted on the frame and provided with actuating means carried by the table for variably rotating the table, the actuating means having thereon a computing scale for indicating degrees of variability of rotation of the table, and a controlling device adjustably mounted on the actuating means to be governed by the scale for controlling the variability of rotation of the table.

19. A cheese cutter including a frame, a table rotatably mounted on the frame, a carrier movably guided adjacent to the table, a spring coöperating with the frame and the carrier to draw the carrier in one direction, a lever pivoted to the carrier and provided with means enabling the lever to clutch the table and move the carrier and the table together in the opposite direction, and separate means coöperating with the frame for stopping the movement of the carrier in both directions.

20. A cheese cutter including a frame, two stop devices spaced apart on the frame, a table rotatable on the frame, a carrier movably guided adjacent to the table, a lever pivoted to the carrier and having a device thereon to be carried by the lever into engagement with the table for moving the carrier and the table together in one direction to be stopped by one of the stop devices, and a spring coöperating with the frame for moving the carrier in the opposite direction to be stopped by the other of the stop devices.

21. A cheese cutter including a frame, two stop devices spaced apart in fixed positions on the frame, a table rotatable on the frame, operating and controlling mechanism for the table movably guided to move either with or independently of the table and including a carrier, a lever pivoted to the carrier and having a contact device thereon adjustable for variable contact with one of the two stop devices, means for locking the mechanism to the table for rotating the table, and a spring coöperating with the frame and the mechanism for retracting the mechanism to the other of the two stop devices.

22. A computing cheese cutter including a rotatable table, and operating mechanism for the table guided by the table and including a carrier having a stop projection, a lever pivoted to the carrier and movable to the projection and provided with a contact device for variably limiting the rotation of the table in one direction, the lever having a projecting device adjustable thereon to be carried by the lever into engagement with the table for variably adjusting the position of the contact device and also coöperating to rotate the table, and a computing scale carried by the lever for governing the adjustment of the adjustable projecting device.

23. In a cheese cutter, the combination of a rotatable table, and a computing scale and operating means governed by the scale and provided with means for locking the operating means to the table, all carried by the table.

24. In a cheese cutter, the combination of a rotatable table, a movably guided carrier provided with a pivot, a lever connected with the pivot, and a locking arm carried on the lever and also connected with the pivot, the arm having two devices thereon for engagement with the table.

25. In a cheese cutter, the combination of a rotatable table comprising a circular rim, a carrier movably supported by the rim and having a pivot, a lever connected to the pivot and having a stud thereon, and an eccentric adjustably secured to the stud to be carried into engagement with the rim for rotating the table.

26. In a cheese cutter, the combination of a rotatably supported table, actuating means for the table carried by the table and including a carrier movable relatively to the table and a lever pivoted to the carrier for moving the carrier to move the table subsequent to movement of the lever, and movable means carried by the carrier for locking the carrier to the table.

27. In a cheese cutter, a rotatable table having operating and controlling mechanism movably supported thereon and provided with means for automatically retracting the mechanism relatively to the table, said mechanism including a pivoted lever for rotating the table, and means movably mounted on the lever for clutching the lever to the table.

28. In a cheese cutter, the combination of a rotatable table, two fixed stop devices, and operating and controlling mechanism movable between the two stop devices and including adjustable means for varying the extent of movement of the mechanism between the stop devices, said mechanism including also means for connecting the mechanism to the table.

29. In a cheese cutter, the combination of a rotatable table, a movable actuating element, means for connecting the element to the table for movable support, locking means mounted on the element for locking the element to the table and provided with a controlling arm, and a lever pivoted to the actuating element and provided with means for operating and controlling the controlling arm.

30. In a cheese cutter, the combination of a rotatable table having a continuous guide, a carrier movably connected with the guide for support and having a stop device, an operating lever pivoted to the carrier and having a stop shoulder to be moved to the stop device, and means mounted on the lever to be moved by the lever into engagement with the table for rotating the table.

31. In a cheese cutter, the combination of a rotatable table comprising a circular rim portion having two continuous guides on the inner and the outer sides respectively, a carrier having guide projections thereon provided with guide members movably engaging and supported by the guides of said rim portion, an operating lever pivoted to said carrier, and means mounted upon the lever for connecting the carrier to the rim portion of the table.

32. In a cheese cutter, the combination of a rotatable table comprising a circular rim, an actuating element movably guided under the rim and provided with a pivot, an operating lever and also a locking arm connected to the pivot, said arm having means for engagement with the said rim for rotating the table, and means carried by the operating lever for controlling said arm and enforcing action of the engagement means thereof.

33. In a cheese cutter, the combination of a rotatable table, a movable actuating element for the table, a lever pivoted to the element for moving the element, a stop to be engaged by the lever, locking means movably mounted on the lever for coöperation with the table and enabling the actuating element to rotate the table, said locking means being automatically controlled by the lever, and a stop to be engaged by the actuating element.

34. In a cheese cutter, the combination with a frame having two stops fixed thereon, and a table rotatable on the frame and having a circular rim, of operating and controlling mechanism guided for movement adjacent to the rim of the table between the stops for engagement with said rim to rotate the table, said mechanism including adjustable means for varying the extent of movement of the mechanism between the stops to variably limit the extent of rotation of the table.

35. In a cheese cutter, the combination with a frame, and a table rotatable on the frame, of a carrier hung on the table and movable thereon, means mounted on the carrier for enabling the carrier to rotate the table, and an operating lever for the table pivoted to the carrier and provided with means for variably limiting the pivotal movement of the lever, and means enabling the lever to variably limit the movement of the carrier.

36. In a cheese cutter, the combination of a frame having a stop fixed thereon, a table rotatable on the frame, a carrier guided to move adjacent to the table to or from the stop, a bridge fixedly secured to the frame and extending above the carrier, a stop member supported by the bridge, a device mounted on the carrier for engaging and locking the table to the carrier, and a controlling member adjustably mounted on the carrier for engagement with the stop member.

37. In a cheese cutter, the combination of a frame, a table rotatable on the frame, two fixed stops on the frame, operating and controlling mechanism guided concentrically to the axis of rotation of the table and movable alternatively to the stops, the mechanism including a pivoted lever and also means for variably determining and limiting the movement of the mechanism between the stops, and locking means included in said mechanism for detachably connecting the mechanism to the table.

38. In a cheese cutter, the combination of a rotatable table comprising a circular rim, an actuating element movably guided under the rim, an operating lever and a locking arm pivoted to said element under said rim, the locking arm having a locking device to engage said rim for connecting the actuating element to said rim, and two controlling devices carried by said lever, one of said devices being movable by the lever into contact with said arm to operate the locking device and the other movable to said rim to govern control of said lever and said arm in operating direction.

39. In a cheese cutter, the combination with a frame, and a table rotatable on the frame and having a circular rim, of an actuating element guided for movement adjacent to the rim of the table, a lever pivoted to said element for movement of the element subsequent to pivotal movement of the lever, a locking device rotatably mounted on said element and operated by said lever for locking said element to said rim, and a spring coöperating with the locking device for assisting the device to lock the said element to said rim.

40. In a cheese cutter, the combination with a frame, and a table rotatable on the frame and having a circular rim, of an actuating element guided for movement adjacent to the rim of the table, a pivoted lever for moving the actuating element and having a projection thereon to be carried to said rim on movement of the lever in one direction to stop pivotal movement of the lever, the lever when pivotally moved in the opposite direction being stopped by the actuating element, and means carried by said element under control of the lever for locking the element to said rim.

41. In a cheese cutter, the combination of a rotatable table, two fixed stop devices, and operating and controlling mechanism movable between and stopped by the stop devices and including a carrier and a lever movably connected to the carrier and having a contact portion for engagement with one of the two stop devices, said mechanism including means for connecting the mechanism to the table and also means for varying the point of engagement of the contact portion of the lever with said stop device for variably limiting the movement of said mechanism.

42. In a cheese cutter, the combination of a frame having two fixed stops, a table rotatable on the frame and having a circular rim, and operating and controlling mechanism having means for locking the mechanism to the rim of the table and guided by the table to move adjacent to said rim, said mechanism being constructed to be steadied by the frame and including a pivoted operating lever provided with an adjustable contact device to be carried to one of the two stops, the mechanism being movable to the remaining one of the two stops.

43. In a cheese cutter, the combination with a frame, a table rotatable on the frame and having a continuous engagement portion, and a knife to coöperate with the frame and the table, of an actuating element guided for movement with the engagement portion and having an operating lever pivoted thereto and limited in pivotal movement by the table and the actuating element coördinately, and movable means coöperating with the actuating element and said engagement portion for enabling said lever and said element to coöperate to rotate the table.

44. In a cheese cutter, the combination with a frame, and a table rotatable on the frame and having a circular rim, of an actuating element guided for movement adjacent to the rim of the table, a locking arm movably mounted on said element and having means thereon for locking said element to said rim, a lever pivoted to said element and having a device thereon for actuating the arm on pivotal movement in one direction, the lever having an adjustable device thereon to be carried to the said rim for limiting the movement of the lever, and means for limiting the pivotal movement of the lever in the opposite direction.

45. In a cheese cutter, the combination with a frame, and a table rotatable on the frame and having a circular rim, of a carrier guided for movement adjacent to the rim of the table and having a pivot thereon, the carrier having an operating lever connected to the pivot, a locking arm having a transversely extending oblong aperture therein receiving the pivot for guiding the arm, the arm being actuated by the lever, and a spring mounted on the lever and yieldingly holding the arm in contact with the forward side of the pivot for rotating the table, said arm having devices on opposite sides of the pivot for engaging the rim of the table.

46. In a cheese cutter, the combination with a rotatable table having a circular rim, of a carrier guided for movement adjacent to the rim and having a pivot, a lever connected to the pivot and having a projection thereon, a controlling member adjustably secured to the lever and having a lug thereon provided with an adjusting screw, said member having also a contact device thereon to be carried to said rim, and an arm connected to said pivot and extending movably between said projection and said screw and having devices thereon for engagement with said rim, for locking said carrier to said rim under control of said lever.

47. In a cheese cutter, the combination with a frame having two stops thereon, and a table rotatable on the frame and comprising a circular rim, of a carrier guided for movement adjacent to the rim of the table and movable to or from one of the two stops, a lever pivotally connected to the carrier and having an eccentric portion to be carried to or from the other of the two stops, the lever having a computing scale thereon, a controlling appliance pivotally mounted on the lever and having an indicating mark to be set to the computing scale, means for adjustably securing the appliance to the lever, and a contact device fixed on the controlling appliance to be carried thereby to the rim of the table.

48. In a cheese cutter, the combination of a frame, a table rotatable on the frame, two fixed stops on the frame, operating and controlling mechanism movably guided concentrically to the axis of rotation of the table between and to the stops and provided with locking means for locking the mechanism to the table, means incorporated in the mechanism acting, when the mechanism is moved in one direction, to actuate the locking means to connect the mechanism to the table, means incorporated in the mechanism for variably determining the extent of movement of the mechanism between the stops, and means incorporated in the mechanism automatically acting, when the mechanism is moved in the opposite direction, to enable the locking means to release the mechanism from the table.

In testimony whereof, I affix my signature in presence of two witnesses.

ELLIS T. SILVIUS.

Witnesses:
J. H. GARDNER,
M. E. SPARROW.

Copies of this patent may be obtained for five cents each, by addressing the "Commissioner of Patents, Washington, D. C."